April 12, 1960   W. K. STEINHAGEN ET AL   2,932,286
WINDSHIELD WIPER ACTUATING MECHANISM
Filed Feb. 10, 1958   3 Sheets-Sheet 1
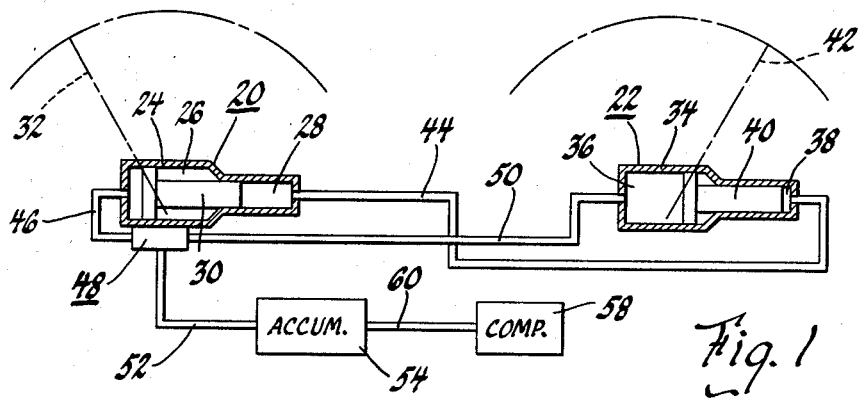
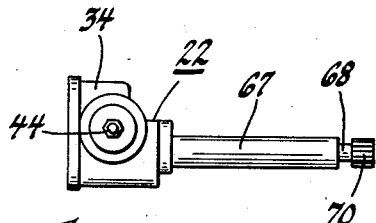
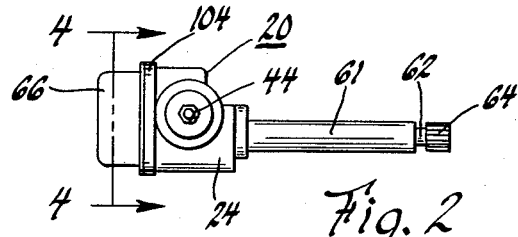
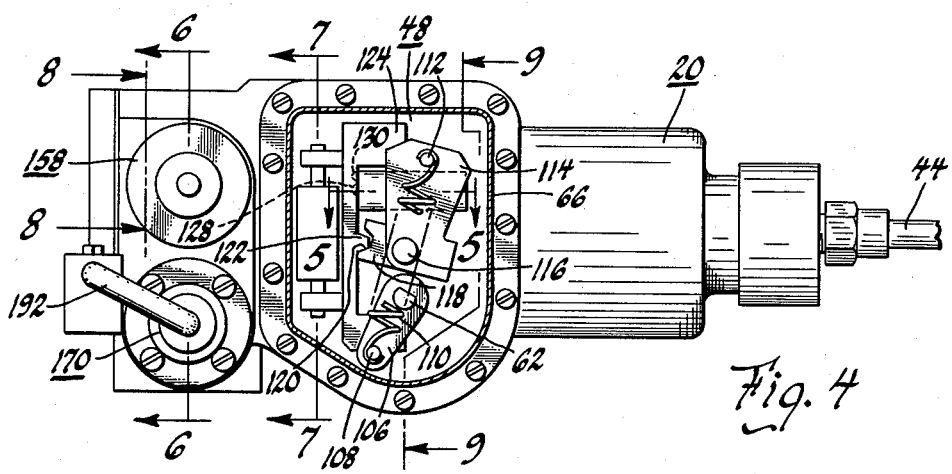
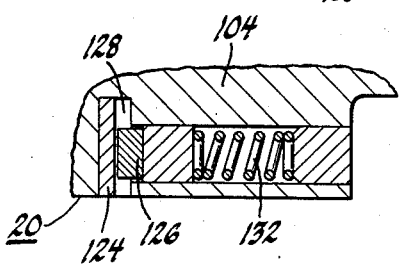
INVENTORS
WILLIAM K. STEINHAGEN
PHILIP L. FRANCIS
ANDRIES C. DE WILDE
ZENON POPINSKI
BY JOHN G. HART
D.C. Staley
THEIR ATTORNEY April 12, 1960 W. K. STEINHAGEN ET AL 2,932,286
WINDSHIELD WIPER ACTUATING MECHANISM
Filed Feb. 10, 1958 3 Sheets-Sheet 2

INVENTORS
WILLIAM K. STEINHAGEN
PHILIP L. FRANCIS
ANDRIES C. DE WILDE
ZENON POPINSKI
BY JOHN G. HART

D. C. Staley
THEIR ATTORNEY

INVENTORS
WILLIAM K. STEINHAGEN
PHILIP L. FRANCIS
ANDRIES C. DE WILDE
ZENON POPINSKI
BY JOHN G. HART

D.C. Staley
THEIR ATTORNEY

United States Patent Office 2,932,286
Patented Apr. 12, 1960

2,932,286

WINDSHIELD WIPER ACTUATING MECHANISM

William K. Steinhagen, Royal Oak, Philip L. Francis, Pontiac, and Andries C. de Wilde, Warren, Mich., and Zenon Popinski, Babylon, and John G. Hart, Rochester, N.Y., assignors to General Motors Corporation, Detroit, Mich., a corporation of Delaware Application February 10, 1958, Serial No. 714,403

7 Claims. (Cl. 121—164)

This invention pertains to actuating mechanism for vehicle windshield wipers, and particularly to a wiper actuating system utilizing hydro-pneumatic wiper motors.

At the present time some vehicles are equipped with air suspension, thus necessitating an air compressor and an accumulator. Since the air compressor is driven by the engine at all times, vehicles with air suspension have an abundant supply of compressed air which can be used for actuating mechanisms such as windshield wiper motors. The present invention relates to windshield wiper actuating mechanism wherein each wiper arm and blade is connected directly to a wiper motor. The wiper motors are of the hydro-pneumatic type, i.e., the wiper motors are interconnected and synchronized by a hydraulic link while being actuated by compressed air.

Accordingly, among our objects are the provision of actuating mechanism for a pair of windshield wipers including a motor for each wiper and hydraulic means for synchronizing the operation of the motors; the further provision of damper means for a hydro-pneumatic windshield wiper motor for decelerating the motor adjacent the stroke ends thereof; the further provision of a hydro-pneumatic wiper motor including means for parking the wiper motor with air under pressure and means for interrupting the connection between the motor and the source of compressed air when the motor is in the parked position; the further provision of ball-type snap acting reversing valve means for a pneumatic wiper motor; and the still further provision of a pneumatic wiper motor including pressure regulating means responsive to the motor load for maintaining substantially constant motor speed, as selected by the operator, irrespective of varying load conditions.

The aforementioned and other objects are accomplished in the present invention by embodying speed control valve and reversing valve means in one motor assembly for controlling the operation of both motors. Specifically, each motor constitutes an integral part of the transmission assembly for each wiper arm and blade. Thus, each motor includes a cylinder having a reciprocable piston therein. The cylinders have cylinder bores of stepped diameter and receive complementary pistons. The larger diameter portion of each cylinder bore constitutes an expansible air chamber, and the smaller diameter portion of each cylinder bore is filled with hydraulic fluid and connected to the smaller diameter cylinder bore of its companion motor. The hydraulic fluid forms a closed hydraulic system for synchronizing the operation of both motors, and for transmitting energy from the air cylinder of one motor to its companion motor.

The piston is formed with an integral rack that meshes with a sector gear attached to a transmission, or pivot, shaft. The pivot shaft is rotatably journalled in the housing, the outer end of the pivot shaft being adapted for driving connection with a wiper arm. Each motor is equipped with a hydraulic damper comprising a variable restriction in the hydraulic link between the two motors. The variable restriction comprises a needle which moves into a fixed orifice and automatically restricts the oil flow in the hydraulic link adjacent each stroke end of the motor. In this manner, the motor pistons are automatically decelerated adjacent the stroke ends to approximate harmonic motion.

The master motor includes a pressure regulating valve, a throttling valve for controlling speed and reversing valve means. The pressure regulating valve includes a spring biased ball valve engageable with a plunger. The ball valve is biased to the closed position by the spring, and the plunger is carried by a diagram which is urged in the opposite direction by a second spring. When the air pressure acting on the diaphragm exceeds the load of the second spring, the ball valve closes and in this manner reduces and regulates the pressure of air supplied to the speed control valve from the accumulator. In order to control the pressure of air in response to the loading of the motor, the spring guide is formed as a cylinder which receives a hollow fixed piston that is connected to the air cylinder of the motor having the higher air pressure.

The reversing valve comprises a pair of balls, each ball being engageable with two O-ring type valve seats. Pressurized air is supplied by the two inner valve seats, and acts to move the balls to the intake position. The valve balls are controlled by a saddle piece having two push rod pins. The saddle piece is actuated in timed relation to movement of the motor piston by an over-center spring device which imparts snap action to the saddle piece.

The speed controlling valve is of the rotary type and is operative to throttle the air flow to the reversing valve inlet. In addition, when the speed controlling valve is moved to the "off" position, a parking port is connected to air pressure. The parking port is directly connected to the master motor cylinder through a piston controlled valve. When the motor piston arrives at the parked position, the valve is automatically closed thereby cutting off the connection of the wiper motor with the supply of compressed air so as to prevent leakage of compressed air through the wiper motors when they are in the parked position.

Further objects and advantages of the present invention will be apparent from the following description, reference being had to the accompanying drawings wherein preferred embodiments of the present invention are clearly shown.

In the drawings:

Figure 1 is a schematic illustration of windshield wiper actuating mechanism constructed according to this invention.

Figure 2 is a side view, in elevation, of the master motor assembly.

Figure 3 is a side view, in elevation, of the slave motor assembly.

Figure 4 is an enlarged view, partly in section and partly in elevation, taken along line 4—4 of Figure 2.

Figures 5 through 9 are views, partly in section and partly in elevation, taken along lines 5—5, 6—6, 7—7, 8—8 and 9—9, respectively of Figure 4.

Figure 10:
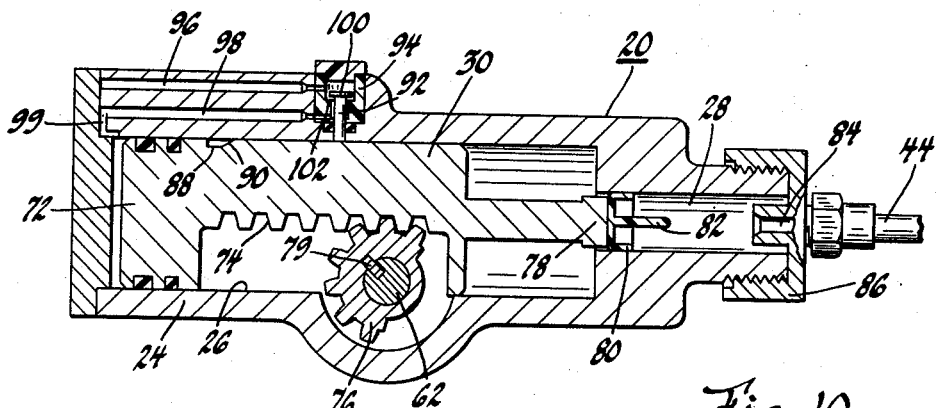

Figure 10 is a longitudinal sectional view of the master motor assembly at one of its stroke end positions.

Figure 11:
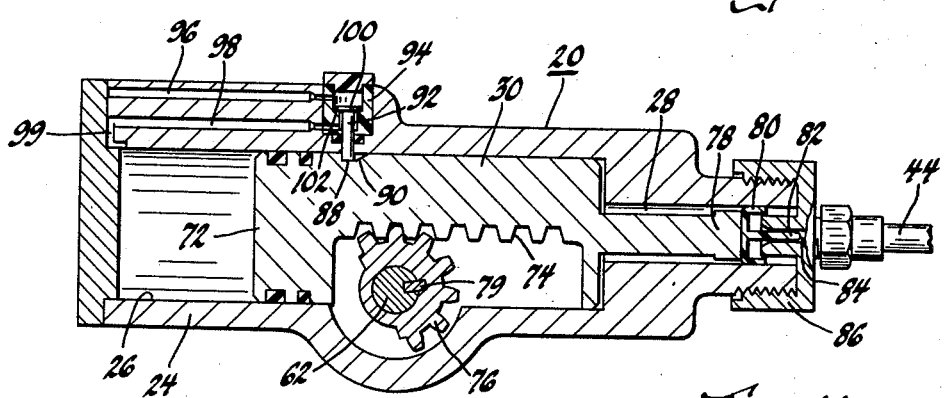

Figure 11 is a longitudinal sectional view of the master motor assembly in the parked position.

Figure 7:
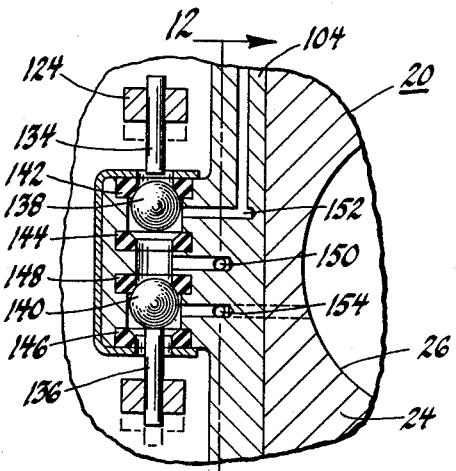
Figure 9:
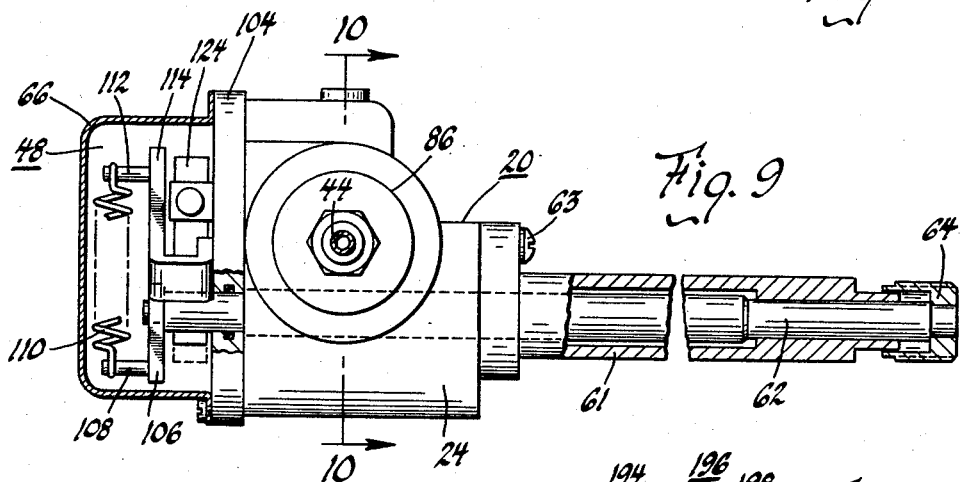
Figure 8:
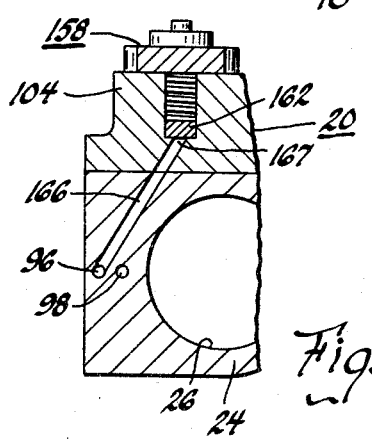
Figure 12:
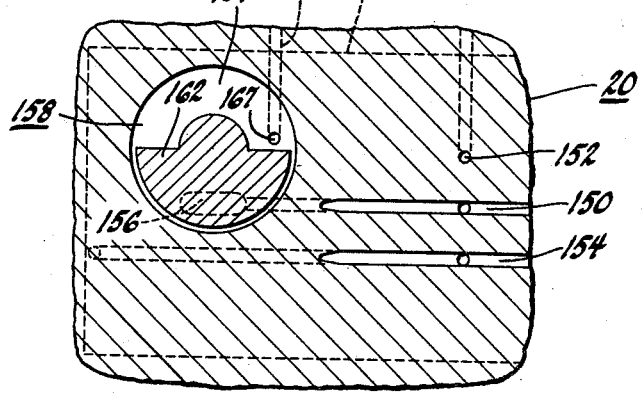

Figure 12 is a fragmentary sectional view taken along line 12—12 of Figure 7.

Figure 6:
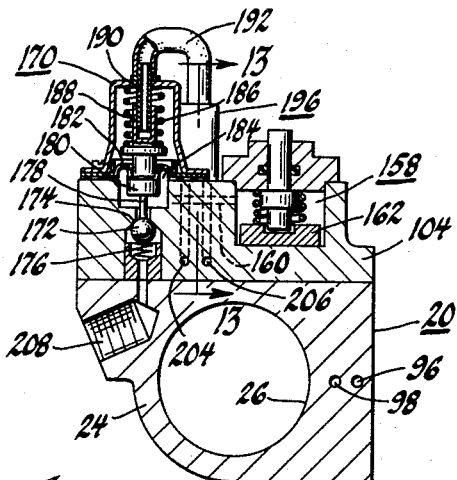
Figure 13:
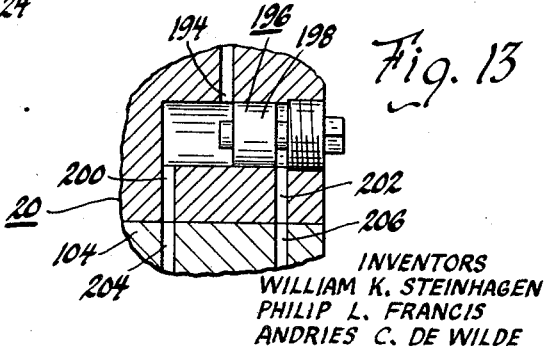

Figure 13 is a fragmentary sectional view taken along line 13—13 of Figure 6.

With particular reference to Figure 1, the actuating mechanism of this invention comprises a master hydro-pneumatic motor 20 and a slave hydro-pneumatic motor 22. The master motor 20 includes a cylinder 24 having cylinder bores 26 and 28 of different diameters. A complementary shaped piston 30 is disposed within the cylinder, the piston being operatively connected to a wiper arm and blade assembly depicted by dotted line 32.

Similarly, the slave motor 22 includes a cylinder 34 having cylinder bores 36 and 38 of different diameters which receive a complementary shaped piston 40. The piston 40 is drivingly connected to a wiper blade and arm assembly indicated by dotted line 42.

The smaller diameter cylinder bores 28 and 38 of the master and slave motors are filled with hydraulic fluid and interconnected by a conduit 44. The larger diameter cylinder bores 26 and 36 comprise expansible air chambers, the bore 26 being connected by a passage 46 to a valve assembly 48 forming part of the master motor assembly.

The air chamber 36 of the slave motor is connected by conduit 50 to the valve assembly 48. The valve assembly 48 is connected by a conduit 52 to an accumulator 54 which is charged by a compressor 58 that is connected to the accumulator by a conduit 60. The accumulator may be charged to a pressure of 300 p.s.i.

As will be pointed out in greater detail hereinafter, the wiper motors 20 and 22 operate to impart asymmetrical oscillation to the wiper blade and arm assemblies 32 and 42 throughout their running strokes. During running operation of the motors, air under pressure is supplied to the cylinder bore 26 while the cylinder bore 36 is connected to atmosphere so that the piston 30 will move to the right. Movement of the piston 30 to the right will impart movement of the piston 40 to the left through the hydraulic link 44. Adjacent the end of the stroke of the piston 30 to the right, the valve mechanism 48 will be actuated to connect bore 26 to exhaust and bore 36 to pressure, so that the piston 40 will move to the right and force the piston 30 to the left through the hydraulic link 44. When it is desired to turn off the wiper motor, the valve assembly 48 is actuated to apply pressure through a parking mechanism to the bore 26 so as to move the piston 30 beyond its normal running stroke end limit to a parked position. The piston 40 will be moved through the hydraulic link 28 to the left beyond its normal stroke end limit position to a parked position. In the parked position, the blade and arm assemblies 32 and 42 preferably will lie against the cowl of the vehicle, not shown, while during the running strokes of the wiper motor, the inboard stroke end limit is above the vehicle cowl.

With reference to Figure 2, the motor 20 is attached to a transmission assembly, comprising a housing 61 and a shaft 62 having a driving head 64 for attachment to a wiper arm. The valve assembly 48 is disposed within a housing 66 attached to the motor cylinder 24. The slave motor, as shown in Figure 3, is likewise attached to a transmission assembly including a housing 67 and a shaft 68 having a driving head 70.

With reference to Figures 10 and 11, the master and slave motor assemblies are of identical construction except for the valve assembly 48 which is attached to the master motor. The piston 30 includes an enlarged head portion 72 disposed within the larger diameter bore 26. The piston is formed with an integral rack 74 which meshes with a sector gear 76 attached by means of a key 79 to the pivot, or transmission shaft 62. The piston 30 includes a smaller diameter portion 78 having attached thereto a plastic cup seal 80 disposed within the smaller diameter bore 28. The seal 80 is formed with an integral contoured damper needle 82 which is movable into and out of a fixed orifice 84 formed in an end cap 86 for the cylinder to which the conduit 44 is connected. During movement of the piston 30 from the position of Figure 10 to the position of Figure 11, the needle 82 enters the orifice 84 adjacent the stroke end to restrict the orifice, and thus restrict the flow of oil in the hydraulic link between the two wiper motors. In this manner the motor pistons will automatically decelerate adjacent the stroke ends so that the movement imparted to the wiper blade and arm assemblies approximates harmonic motion.

In addition, the motor piston 30 is formed with a notch 88 having a ramp 90. A reciprocable parking valve 92 is mounted within a valve housing 94 attached to the cylinder 24. The valve 92 controls the connection of a passage 96 with a passage 98. The valve 92 includes an enlarged head portion 100 which is engageable with a valve seat 102 formed in the valve housing 94. The passages 96 and 98 are interconnected at all times by the valve 92 except when the piston 30 is moved beyond its normal running stroke end position to the parked position as shown in Figure 11. When the piston 30 is in the parked position, the stem of the valve 92 falls into the notch 88 whereupon the head 100 engages the seat 102 thereby closing the connection between the passages 96 and 98.

With reference to Figures 4 through 9, the transmission housing 61 is attached to the cylinder housing 24 by a plurality of screws, such as indicated by numeral 63. In addition, the shaft 62 extends through a porting plate 104, the end of the shaft 62 being disposed within the cover 66. The inner end of the shaft 62 is connected to a crank arm 106 having a pin 108 which receives one end of an over-center toggle spring 110. The other end of the toggle spring 110 is connected to a pin 112 formed on a yoke type rocker 114. The rocker 114 is mounted for pivotal movement about a pin 116, as shown in Figure 4, and includes an arm portion 118 having a notched end 120 which receives a lug 122 formed on a reciprocable saddle piece 124. The saddle piece is movable between two positions as determined by a detent element 126 engageable with notches 128 and 130 in the saddle piece. As seen in Figure 5, the detent element 126 is biased into engagement with the saddle piece by a compression spring 132. The saddle piece 124 is shown in its upper position in Figure 4. Upon oscillation of the shaft 62 in the counterclockwise direction as viewed in Figure 4, the crank arm 106 through the pin 108 will move the lower end of the toggle spring 110 over center, that is on the other side of the line interconnecting the axis of the shaft 62 and the axis of pivot pin 116. When the toggle spring 110 is moved over center, the rocker 114 will move with a snap action to its other extreme position thereby moving the saddle piece 124 downwardly so that detent element 126 engages notch 130.

Upon reversal of motor piston movement, the shaft 62 will oscillate in the opposite direction so as to move the toggle spring 110 back across the center of the line connecting the axes of the shaft 62 and the pivot pin 116 so that the rocker arm 114 will move with a snap action back to the position of Figure 4. The rocker arm 114 moves with a snap action, and thus imparts snap action movement to the saddle piece 124. The saddle piece 124 controls reversing valve means, to be described, for alternately connecting air chambers 26 and 36 of the motors to exhaust and pressure.

With particular reference to Figure 7, the saddle piece 124 has a pair of pins 134 and 136 attached thereto. The push rod pins 134 and 136 actuate the reversing valve means which comprises a pair of balls 138 and 140, the ball 138 being movable between O-ring valve seats 142 and 144, while the ball 140 is movable between O-ring valve seats 146 and 148. O-ring valve seats 144 and 148 connect with an air supply passage 150 in the valve plate 104. The ball 138 controls the connection of passage 152 to exhaust through O-ring 142 or to pressure through O-ring 144. Similarly, the ball 140 controls the connection of passage 154 to pressure or exhaust through O-rings 148 and 146 respectively. The pressure of air supplied through passage 150 normally acts to move the balls 138 and 140 so that they engage the exhaust O-ring seats 142 and 146. The pins 134 and 136 are aligned with the O-rings 142 and 146, and with the saddle piece 124 in its upper position, as shown in Figures 4 and 7, the pin 136 has moved ball valve 140 into engagement with O-ring 148. Accordingly, passage 152 is connected to pressure passage 150, the air pressure maintaining the ball 138 in sealing engagement with O-ring 142. Upon movement of the saddle piece 124 downwardly wherein detent 126 engages notch 130, the pin 134 will engage ball 138 and force it into sealing engagement with O-ring 144. Downward movement of the pin 136 will permit the air under pressure from passage 150 to move ball 140 into sealing engagement with O-ring 146.

Air under pressure is supplied to passage 150 from port 156 of the speed control valve 158. The speed control valve 158 is of the rotary type for throttling the flow of air from passage 160 through port 156 to the passage 150. The valve disc 162 is formed with a cutaway portion 164, and when the valve 158 is in the "off" position as shown in Figure 12, a passage 166 is connected to the passage 160. The passage 166 connects with the passage 96 in the cylinder 24, and thus constitutes the parking passage.

When the rotary valve 156 is rotated in the counterclockwise direction as viewed in Figure 12, the port 167 is closed while the port 156 will be opened to the extent determined by the degree of rotation of the valve. Accordingly, air will be supplied from the passage 160 through the valve chamber to port 156 and thence to passage 150. Passage 154 connects with the air chamber 26 of the master motor. Passage 152 is connected with the conduit 50 that communicates with the air chamber 36 of the slave motor.

Air is supplied to the passage 160 from a combined pressure regulator valve and pressure reducer valve indicated generally by the numeral 170 in Figure 6. The pressure regulator valve includes a ball 172 engageable with a seat 174 and urged into engagement with seat 174 by a spring 176. The ball 172 can be moved out of engagement with the seat 174 by a pin 178 attached to a plunger 180. The plunger 180 is attached to a diaphragm 182 which is responsive to air pressure in chamber 184 that is connected to passage 160. The diaphragm 182 is biased downwardly, as viewed in Figure 6, by a coil spring 186 which surrounds a hollow guide pin 188. The hollow guide pin 188 receives a fixed hollow pintype piston 190 which is connected to a conduit 192. The pressure reducer valve operates to reduce accumulator pressure at 300 p.s.i. to 100 p.s.i. in chamber 184. As seen in Figure 13, the conduit 192 connects with a port 194 of a shuttle valve 196, the shuttle valve including a reciprocable element 198 movable in opposite directions, so as to connect either port 200 or port 202 with the port 194. Port 200 is connected to passage 204 and port 202 is connected to passage 206. Passage 204 connects with passage 152, and passage 206 is connected with passage 154. Accordingly whichever of the passages 152 or 154 is connected to the pressure supplied by the reversing valve, the pressure in this passage will move the shuttle valve element 198 so as to apply the same motor pressure to port 194 and conduit 192. The pressure supplied through conduit 192 and the piston 190 will assist the spring 188 in urging the diaphragm 182 downwardly so that the pressure of air supplied to passage 160 will automatically increase upon an increase in the load being moved by the motors. This feature of load demand pressure regulation will maintain motor speed substantially constant irrespective of varying load conditions as determined by the setting of the manual speed valve 158. The inlet side of the ball valve 172 is connected to a port 208 which is connected to the conduit 52.

Operation of the windshield wiper actuating mechanism of this invention is as follows. When the manual control valve 162 is moved in the counterclockwise direction as viewed in Figure 12, to uncover port 156, air is supplied to the passage 150. Since the motor piston 30 is in the parked position as shown in Figure 11, air will be supplied through O-ring 144 to passage 152 and thence to conduit 50 to air chamber 36 of the slave motor 22. Accordingly, the slave motor piston 40 will move to the right thereby causing movement of the piston 30 to the left through the hydraulic link 44. As the piston 30 approaches its left hand stroke end limit, the reversing valve will be actuated by the saddle piece 124 so as to connect passage 154 to pressure and passage 152 to exhaust. Accordingly, the piston 30 will move to the right from the position shown in Figure 1 thereby causing movement of the slave piston 40 to the left through the hydraulic link 44. The motors will continue to operate in a synchronized manner as long as the valve 152 is in the "on" position.

When the manual valve 158 is turned to the "off" position, the port 156 is covered and the port 167 is opened. This will allow air under pressure to flow through passage 166 to passage 96. Accordingly, air will be supplied through the parking valve 92 to passage 98, the passage 98 being connected by port 99 to the expansible chamber 26 of the master motor. Therefore, the piston 30 will move from the position of Figure 10 to the position of Figure 11, at which point the stem of the valve 92 will fall into the notch 88 thereby cutting off communication between passages 96 and 98 so that the piston 30 will come to rest in the position of Figure 11. Piston 40 of the slave motor will likewise be moved through the hydraulic link to the parked position beyond the running stroke end.

While the embodiments of the invention as herein disclosed constitute preferred forms, it is to be understood that other forms might be adopted.

What is claimed is as follows:

1. In combination, a fluid motor having a cylinder, a reciprocable piston disposed in said cylinder, reversing valve means for subjecting opposite sides of the piston to differential pressures in alternate directions to reciprocate the same throughout a running stroke, piston operated means for actuating the reversing valve means at either end of the running stroke of said piston, a manual control valve for by-passing said reversing valve means and subjecting one side of said piston to a differential pressure in one direction to move the piston beyond its running stroke to a parked position, and a parking valve actuated by said piston for interrupting the differential pressure application to said one piston side when said piston arrives at the parked position.

2. The combination set forth in claim 1 wherein said parking valve comprises a reciprocable plunger engageable with said piston, and wherein said piston has a notch which is aligned with said plunger when the piston is in the parked position.

3. In combination, a fluid motor having a cylinder, a reciprocable piston disposed in said cylinder, reversing valve means for subjecting opposite sides of the piston to differential pressures in alternate directions to reciprocate the same throughout a running stroke, said reversing valve means comprising a pair of balls, each ball being engageable with a pair of spaced valve seats, each ball being pressure actuated into engagement with one of said seats, piston operated means for alternately moving said balls into engagement with their other valve seats, and a manual control valve for by-passing said reversing valve means and subjecting one side of said piston to a pressure differential in one direction to move the piston beyond its running stroke to a parked position.

4. In combination, a fluid motor having a cylinder, a reciprocable piston disposed in said cylinder, reversing valve means for subjecting opposite sides of the piston to differential pressures in alternate directions to reciprocate the same throughout a running stroke, said reversing valve means comprising a pair of balls, each ball being engageable with a pair of spaced valve seats, each ball being pressure actuated into engagement with one of said valve seats, and a reciprocable saddle having a pair of pins movable through said one valve seat of each ball for moving it into engagement with the other valve seat, piston operated means for reciprocating said saddle at either end of the running stroke of said piston, and a manual control valve for by-passing said reversing valve means and subjecting one side of said piston to a differential pressure in one direction to move the piston beyond its running stroke to a parked position.

5. The combination set forth in claim 4 wherein said piston operated means includes an over-center toggle spring for effecting snap action movement of said saddle.

6. The combination set forth in claim 4 including a parking valve actuated by said piston for interrupting the differential pressure application to said one piston side when the piston arrives at the parked position.

7. In combination, a fluid motor having a cylinder, a reciprocable piston disposed in said cylinder, a source of fluid under pressure, reversing valve means for subjecting opposite sides of the piston to differential pressures in alternate directions to reciprocate the same, said reversing valve means including a pressure inlet port and a pair of control ports which are alternately connectible to said pressure inlet port and exhaust, means connecting said pressure inlet port to said source of fluid pressure including a pressure regulating valve comprising, a throttle valve having opposed pressure responsive surfaces and a spring urging said throttle valve towards an open position, passage means connecting the inlet port with the pressure responsive surface acting in opposition to said spring, and a shuttle valve operable to connect the pressure responsive surface acting to assist said spring with the control port having the higher pressure potential whereby the pressure at said inlet port will be regulated in accordance with the load imposed upon said motor.

References Cited in the file of this patent

UNITED STATES PATENTS

| | | |
|---|---|---|
| 1,467,522 | Amsler | Sept. 11, 1923 |
| 1,619,474 | Hubbard | Mar. 1, 1927 |
| 1,953,454 | Wollaeger | Apr. 3, 1934 |
| 2,105,473 | Dean | Jan. 18, 1938 |
| 2,265,307 | Orshansky | Dec. 9, 1941 |
| 2,450,653 | Galley et al. | Oct. 5, 1948 |
| 2,462,580 | Watson | Feb. 22, 1949 |
| 2,547,175 | Sacchini | Apr. 3, 1951 |

FOREIGN PATENTS

| | | |
|---|---|---|
| 748,649 | France | Apr. 25, 1933 |
| 517,314 | Great Britain | Jan. 26, 1940 |